United States Patent
Reynolds

(10) Patent No.: US 7,670,092 B2
(45) Date of Patent: Mar. 2, 2010

(54) LAMINATED NUT WITH CENTER TENSION SLEEVE

(76) Inventor: Richard L. Reynolds, 52 Wexford Club Dr., Hilton Head Island, SC (US) 29928

( * ) Notice: Subject to any disclaimer, the term of this patent is extended or adjusted under 35 U.S.C. 154(b) by 406 days.

(21) Appl. No.: 11/641,096

(22) Filed: Dec. 19, 2006

(65) Prior Publication Data

US 2007/0154288 A1 Jul. 5, 2007

Related U.S. Application Data

(60) Provisional application No. 60/751,289, filed on Dec. 19, 2005.

(51) Int. Cl.
  *F16B 37/00* (2006.01)
(52) U.S. Cl. .................. 411/432; 411/533; 411/544
(58) Field of Classification Search ............... 411/149, 411/155, 156, 285, 432, 437, 533, 544, 917
See application file for complete search history.

(56) References Cited

U.S. PATENT DOCUMENTS

| | | | | |
|---|---|---|---|---|
| 1,320,259 A | * | 10/1919 | Martens | 411/149 |
| 1,425,725 A | * | 8/1922 | Trepier | 411/149 |
| 1,945,005 A | * | 1/1934 | Vacher | 411/134 |
| 4,763,456 A | * | 8/1988 | Giannuzzi | 52/410 |
| 4,897,006 A | * | 1/1990 | Blin | 411/368 |
| 5,139,380 A | * | 8/1992 | Reynolds | 411/437 |
| 5,904,460 A | * | 5/1999 | Kawabata | 411/155 |
| 6,019,557 A | * | 2/2000 | Lo et al. | 411/176 |
| 6,840,483 B1 | * | 1/2005 | Dickens | 248/56 |
| 2006/0013670 A1 | * | 1/2006 | Sullivan et al. | 411/155 |
| 2007/0098524 A1 | * | 5/2007 | Dunlap et al. | 411/533 |

* cited by examiner

Primary Examiner—Flemming Saether
(74) Attorney, Agent, or Firm—Welsh & Flaxman LLC

(57) ABSTRACT

A laminated nut having a plurality of conical spring discs for use with a bolt assembly. Each of the discs is formed with a hex shaped outer periphery and a non-round central bore. The discs are assembled on top of each other forming a laminated stack. A threaded tension sleeve is located in the central bore and has a non-round outer periphery shape corresponding to the shape of the central bore of the discs. The tension sleeve has a threaded inner peripheral wall with the threads sized to fit the bolt assembly. The tension sleeve includes an upper flange to engage and hold the upper portion of the laminated stack and a lower flange to support the laminated stack. Application of a torqueing force to the outer, hex shaped periphery of the discs forces them to deflect and contact the threaded tension sleeve applying force along the length of the bolt assembly in a uniform manner to reduce clearance between the bolt threads and the threads on the nut tension sleeve.

13 Claims, 2 Drawing Sheets

LAMINATED NUT WITH CENTER TENSION SLEEVE

CROSS REFERENCE TO RELATED APPLICATION

This application claims the benefit of U.S. Provisional Patent Application No. 60/751,289, filed Dec. 19, 2005, entitled "LAMINATED NUT WITH CENTER TENSION SLEEVE".

BACKGROUND OF THE INVENTION

1. Field of the Invention

The present invention relates to laminated nuts for bolts or threaded stud loading and assembly. In particular, the present invention relates to a laminated nut structure having a center threaded tension sleeve.

2. Description of the Prior Art

Conventional hex nut structures create an uneven load concentration when assembled on a mating bolt device. Typically, the load concentration occurs at the lower two to three threads. Conversely, the load concentration on the upper threads is reduced primarily due to dilation of the nut's upper internal diameter as load is placed on the nut, resulting in increased shear forces on the bottom threads. The end result often is loosening of the nut when it is subjected to vibration, leading to ultimate failure of the nut and bolt connection.

In order to overcome the limitations of conventional nut and bolt assemblies, laminated hex nut structures were developed. These structures use a series of laminations with a threaded internal bore to match an associated bolt and a cage holding the parts together. Typically, the nut structures include a bottom plate or washer retained by the cage. Prior art laminated nut structures are disclosed in a series of patents to Reynolds, which are incorporated herein by reference, U.S. Pat. Nos. 4,383,787; 4,900,209; 4,930,962; 4,940,377; 4,984,319; 5,017,079 and 5,049,017. However, a problem with the caged design and threaded laminations is caused by deflection of the laminations under load, this can cause the internal threads to change angle at the point of loading with the bolt. The result can be thread erosion and wear on the bolt or male threads. In addition, reduction of the inside diameter of the laminations contributes to thread erosion. The specific area is the crown of the male thread and root of the female thread. The end result is a compromised nut and bolt assembly, as well as reduced reusability. The conditions related to thread erosion are usually a result of installation over torqueing and the present invention overcomes this problem, as the sleeve type laminated nut of the present invention will support higher loads per thread of engagement.

SUMMARY OF THE INVENTION

In accordance with the present invention, an improved laminated nut structure is provided to eliminate the disadvantages of the prior art. The nut structure of the present invention utilizes a stacked series of conical spring discs formed into a laminated stack with a center tension tube or sleeve that is threaded to conform to a mating bolt structure to ensure reliable bolt loading and connection assembly. The stacked, conical spring disc laminations are hex shaped on the outer periphery to provide wrenching surfaces for nut installation and removal. Although a hex is the desired wrench engaging shape it is readily understood that the outer periphery could take on many different wrench engaging shapes. A central hole, which is generally non-round, is provided in the laminated stack for the tension sleeve.

The center tension sleeve of the nut structure extends from the top to the bottom of the laminated stack. The sleeve may be contiguous or may use one or a series of slits in a vertical direction between the top and bottom of the nut structure to facilitate inward movement under load. The slits may also be angled. The shape of the outer periphery of the tension sleeve is also generally non-round and conforms to the shape of the central hole in the laminated stack to resist rotation from the wrenching forces applied on the outer hex shape of the laminated stack during loading. The hole in each disc in the laminated stack may include radiused recesses making it non-round. The shape of the outer periphery of the tension sleeve and the shape of the central hole in the laminated stack may take a variety of different shapes to resist rotation between them. The inner periphery of the center tension sleeve is threaded to conform to the threads of a complementary bolt or stud. Tap forming the threads is a method utilizing controlled pressure as opposed to cutting to produce threads in a hole. When used on a round tension sleeve after nut assembly, the tap will cause flowing of the material around the outer periphery of the tension sleeve into the recessed radiused notches in the central hole of the laminate disc to create the non-round anti-rotational feature.

The center tension sleeve also serves as the assembly means for the laminated stack. The sleeve extends completely through and beyond upper and lower edges of the central hole in the laminated stack of discs. The center sleeve is flanged at the top in order to fold over onto the upper disc of the laminated stack and retain the laminated stack between the flange and bottom component, which may be the bottom most spring disc, a free spinning washer or a fixed washer. The bottom of the center sleeve is mechanically attached to the component via a flared out section of the center sleeve to make the nut a solid unit.

To assemble the nut to a correspondingly sized bolt, wrenching forces are applied to the outer hex shaped sides of the laminated stack. The upper flange on the center sleeve provides initial loading from the top to the bottom of the nut. The loading causes the conical shaped spring laminations to deflect; the tension sleeve travels the dimension related to the laminations deflection. Due to the geometry the internal diameter of the bore in the laminate decreases as it is deflected from its conical state toward a flat state. Further, part of the vertical load force is now transferred to the outside walls of the tension sleeve countering the vertical movement of the tension sleeve and reduces loading of the flange, as these load forces are now partially angular or radially applied to the tension sleeve. The increased loading resulting from the wrench torqueing will cause a reduction of the tension sleeve diameter and reduce the designed clearance between the nut and bolt threads. This reduction in thread gap clearance and sidewall pressure combined with the spring characteristics of the conical laminations will act to resist counter rotation. The tension sleeve nut assembly of the present invention, as opposed to other forms of laminated nuts, can contribute complementary bolt stretch characteristics in the bolt-stretch load range. The radial forces on the sleeve at the point of lamination deflection combined with increased friction supports the majority of the bolt loading. It will be appreciated that design of the nut configuration, material used, material thickness and clearance dimensions can be altered and are dictated by desired performance of the nut and bolt assembly.

A primary object of the present invention is the provision of a laminated nut structure that equalizes thread load distribution forces along the bolt and nut mating surfaces.

Another object of the present invention is the provision of a laminated nut structure that minimizes loosening, thread damage and failure of the nut and bolt assembly due to uneven loading of wrenching forces and significantly improves both nut and bolt reuse.

Yet another object of the present invention is to reduce the friction caused by uneven load distribution of the thread loading from bottom to top which is characteristic of solid nuts. The torque-tension relationship uniformity is enhanced and reuseability is improved.

Another object of the present invention is the provision of a laminated nut structure that eliminates threads on the laminations stack.

It is an object to use the present invention as a lug nut on vehicles, aerospace, commercial structural, and other general fastening applications.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

Figure 1:
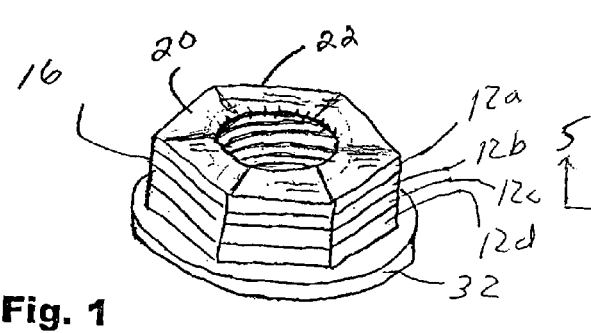
FIG. 1 is a perspective view of a laminated nut in accordance with the present invention.
Figure 4:
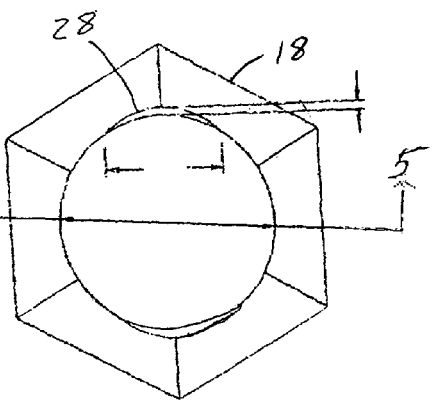
FIG. 4 is a plan view of the center tension sleeve.
Figure 2:
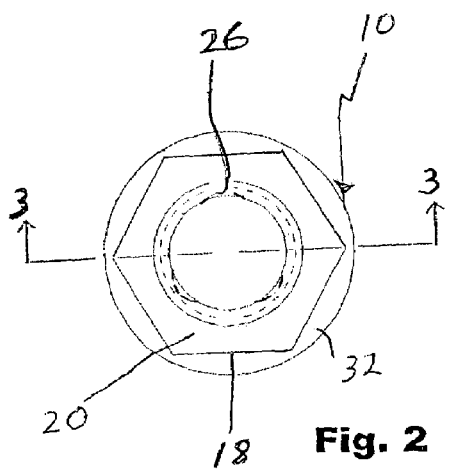
FIG. 2 is a top plan view thereof.
Figure 5:
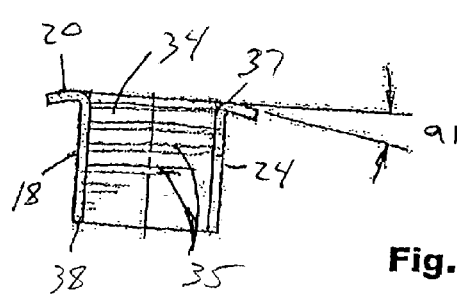
FIG. 5 is a sectional view taken along the lines 5-5 of FIG. 4.

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as the basis for the claims and as a basis for teaching one skilled in the art how to make and/or use the invention.

Referring to FIGS. 1 to 7, a laminated nut 10 is disclosed. The laminated nut 10 includes a conical spring, top disc 12a and a conical spring, bottom disc 12d stacked upon each other defining a laminated stack 16 having a common central bore 14 and an outer wrench engaging surface 25. The laminated nut 10 further includes a generally cylindrical tension sleeve 18 located in the central bore 14. The tension sleeve 18 has an outer wall 24 shaped and dimensioned to substantially conform with the shape of said central bore 14 and an inner wall 34 which includes threads 35.

The tension sleeve 18 has a first end 37 and a second end 38. The first end 37 of the tension sleeve 18 includes an outwardly extending upper flange 20 and the second end 38 includes an outwardly extending bottom flange 30. The upper flange 20 and the bottom flange 30 are shaped and dimensioned to retain the top disc 12a and the bottom disc 12d in a stacked relation with the tension sleeve 18 fixedly secured within the laminated stack 16.

More particularly, the laminated nut 10 includes a series of hex-shaped, conical spring discs 12a-d forming a laminated stack 16. While four discs are disclosed in accordance with a preferred embodiment of the present invention, as few as two discs or more than four discs may be used without departing from the spirit of the present invention. Each disc 12a-d includes a central bore or hole and, as such, when the discs 12a-d are stacked in accordance with the present invention they define a central bore 14 of the laminated stack 16.

Each of the discs 12a-d includes an obliquely oriented surface. Specifically, each disc 12a-d is conical in shape and is angled from the horizontal by an angle (a2). The angle can be varied to adjust the spring rate of the disc. It is contemplated that the angle (a2) would be between approximately six and approximately twenty degrees, however, and in accordance with a preferred embodiment, an angle of approximately 18 degrees has been found to be very effective. The cone angle (a2) is dependent on basically the same design criteria as used in the design of conical washers; that is, material thickness; outside diameter; inside diameter; and load requirements. The threaded tension sleeve type laminated nut 10 of the present invention can tolerate a higher cone angle (a2) for each disc than other types of laminated nuts because the disc making up the laminations are not threaded and the loads are distributed in different planes. The greater the angled surface of the disc, the larger will be the force applied to central tension sleeve 18.

The assembled laminated nut 10 includes a threaded central tension tube or sleeve 18. The tension sleeve 18 includes a first end 37 and second end 38. The first end 37 is provided with a rolled over, outwardly extending upper flange 20. The outer edge 22 of the upper flange 20 is hex shaped to correspond with the shape of the hex shaped spring discs 12. The angle (a2) of the conical spring discs 12a-d corresponds to angle (a1) formed by the upper flange 20 and the horizontal line running across the top of the laminated nut 10. Thus, the spring discs 12a-d are able to mate with the flange 20 when in an unloaded state.

Once threaded by formed tapping, the outer periphery or wall 24 of the tension sleeve 18 is of a non-round shape that corresponds to the non-round shape of the central bore 14 whereby the tension sleeve 18 is fixedly coupled in the central bore 14 of the laminated stack 16. In the embodiment described above, the non-round shape of the central bore 14 may be formed by including radiused notches 26, best seen in FIG. 6, that correspond to mating projections 28 on the tension sleeve 18 to prevent rotation between the parts. The depth of each notch could be adjusted depending upon the desired use for the nut assembly, however, it is contemplated that the depth would be between 30 to 50% of the thread depth. Further, it is contemplated that various other mating shapes could be formed between the sleeve outer periphery and central bore of the laminated stack, so long as they mate and prevent rotation of one part relative to the other.

The second end 38 of the tension sleeve 18 includes a lower part or portion which is composed of an outwardly extending bottom flange 30 of the sleeve 18. In accordance with a preferred embodiment, the bottom flange 30 is mechanically attached to a washer 32 such that the tension sleeve 18 maintains the laminated stack 16 assembled when the flange 20 is rolled over against the top surface 17 of the top disc 12a and the bottom flange 30 of the sleeve 18 is angled into engagement with the angled bore 31 in the washer 32. The cylindrical inner peripheral wall 34 of the sleeve 18 is threaded to match the thread configuration of a bolt (not shown) used in combination therewith. As previously stated, the center tension sleeve 18 is provided with an extended length or portion 30 to facilitate attachment to the washer 32 by bending or flaring the length 30 to form the bottom flange that is in frictional engagement with the angled bore 31 in the washer 32. The washer 32 is then free to spin as the laminated stack 16 is rotated.

Figure 6:
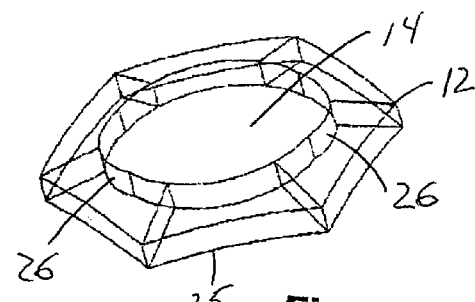
FIG. 6 is a plan view of a conical spring disc.
Figure 3:
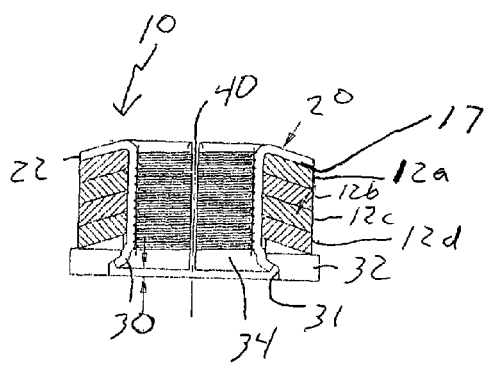
FIG. 3 is a sectional view taken along lines 3-3 of FIG. 2.
Figure 7:
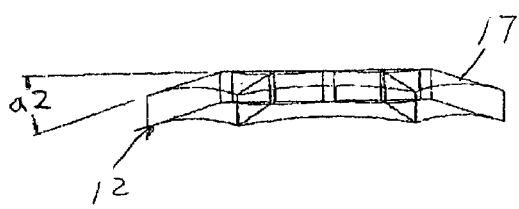
FIG. 7 is a side view of a conical spring disc.
Figure 11:
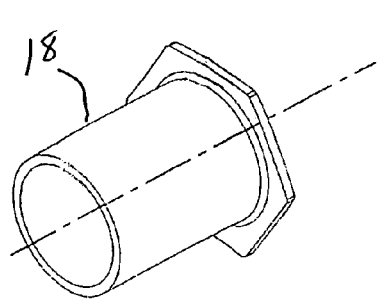
FIG. 11 is a perspective view of a solid tension sleeve.
Figure 12:
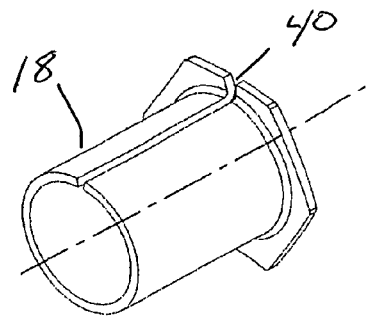
FIG. 12 is a perspective view of a split tension sleeve.

Two basic center tension sleeve structures are contemplated, a solid extruded tube as shown in FIG. 11 and a split tube with a gap 40 as shown in FIG. 12 (both embodiments of the tension sleeve are assigned reference numeral 18 as they are similar parts and may be used interchangeably). The split tube tension sleeve 18 shown in FIG. 12 has a controlled gap size that after assembly with the conical spring discs 12a-d will result in an almost zero size gap. As previously stated, the discs 12a-d would have a non-round inside diameter as best shown in FIG. 6. The tri-lobular configuration shown has three curved notches 26 wherein the apex or center depth of each curved notch or lobe is 30% of the total thread depth on tension sleeve 18. The inward pressure on the tension sleeve 18 created by the discs 12a-d as they flatten out also aids in preventing rotation between the tension sleeve 18 and laminate stack 16. To assemble the laminated nut 10 to a correspondingly sized bolt, wrenching forces are applied to the outer hex shaped sides of the laminated stack 16. The upper flange 20 on the center tension sleeve 18 provides initial loading from the top to the bottom of the nut 10 until the loading forces are transferred to the inner threaded wall 34 of the tension sleeve 18 as a result of the reduction of the diameter of the central bore 14 of the laminated stack 16. Continued torqueing force causes the laminated stack 16 and tension sleeve 18 to move together, deflecting the laminated stack 16. This causes the central bore 14 of the stack 16 to reduce in size and apply force on the outer wall 24 of the tension sleeve 18. The inward radial pressure resulting from the central bore 14 reduction of the laminated stack 16 counters the vertical movement of the tension sleeve 18 and reduces loading on the upper flange 20 of the tension sleeve 18. The radial forces on the tension sleeve 18 at the point of lamination deflection support and equally distribute the majority of the bolt loading along the entire threaded length of the tension sleeve 18. The radial forces on the tension sleeve 18, in the upper range of the bolt loading, reduce thread clearance between the bolt and nut 10 that, in turn, controls resistance to counter rotation and loosening.

Figure 8:
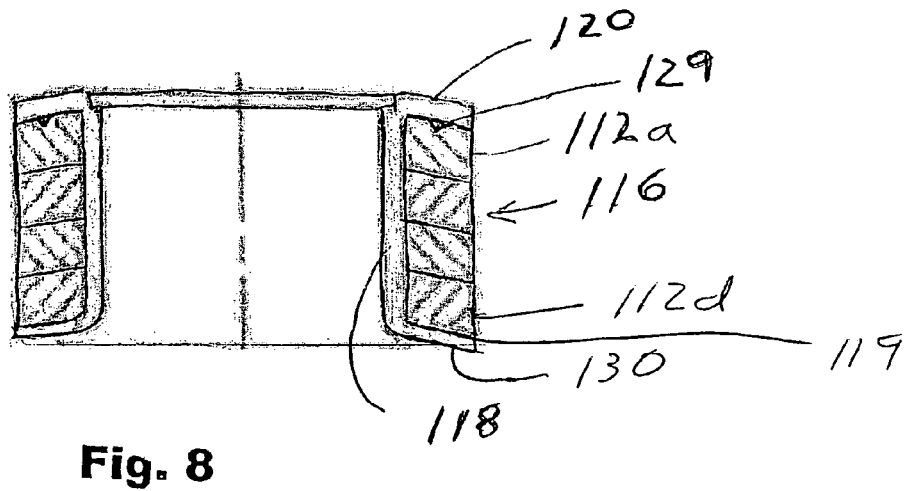
FIG. 8 is a sectional view of a second embodiment of a laminated nut without a separate washer.
Figures 9, 10:
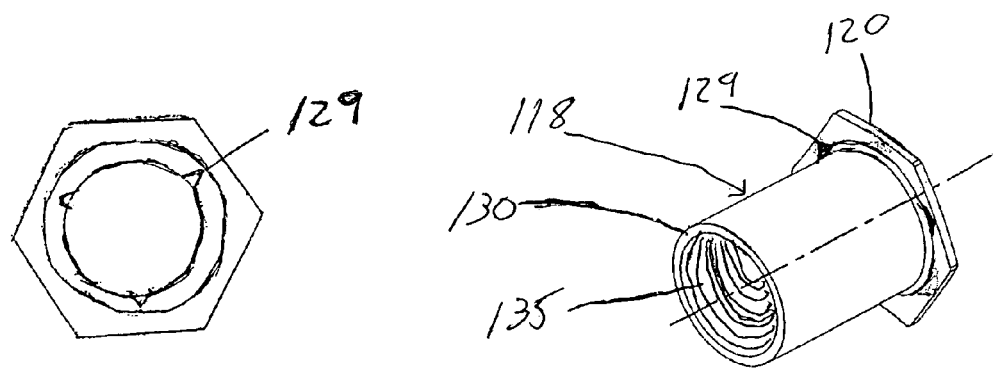
FIG. 9 is a plan view of the center tension sleeve shown in FIG. 8.
FIG. 10 is a perspective view of the center tension sleeve shown in FIG. 8.

In accordance with a second embodiment as shown in FIGS. 8-10, the tension sleeve 118 may be cylindrical and include gussets 129 in the upper flange 120, thus eliminating the need for the outer wall of the sleeve to be non-round. The gussets 129 are shaped and dimensioned to engage the laminate stack 116 to prevent rotation between the tension sleeve 118 and laminate stack 116 formed of conical spring discs 112a-d. This second embodiment is shown not to include the washer 32 disclosed with reference to the embodiment described above, as the outwardly extending bottom flange 130 directly engages the bottom surface 119 of disc 112d and functions to retain the discs 112a-d in their stacked configuration.

The spring discs 12a-d, 112a-d, tension sleeve 18, 118 and washer 32 may be made of various materials such as high carbon steel, medium carbon steel, stainless steel or steel alloy. It also would be possible to make sleeves of non-corrosive materials for special applications such as electrical conductivity or reduction of electrolysis.

The threads 35, 135 in center tension sleeve 18, 118 are preferably tap formed, however, it is contemplated that cut tapping could be used to form the threads. Thread forming taps would function to flow the outer wall material of the tension sleeve into and fill the recesses in the laminations. Thread forming taps have no cutting grooves to cut or remove material in the tapping process. The taps are designed with a series of small lobes on their outer periphery. The taps are hardened and tempered to have very high compressive strength and shock resistance. When form tapping the starting hole size of the nut or solid material is proportionally larger than that used for a cutting tap. The small lobes, several per thread pitch, move the metal through displacement under pressure. The size of the hole is basically the pitch diameter of the thread. Material is displaced outward and inward to form the thread. When you form tap a thin walled tube like the sleeve in the present invention, the sleeve must be first placed in a supporting cavity or the outgoing pressures will expand the walls of the sleeve and the thread will not be fully formed. Another nuance of the tap forming threads will be the creation of a small ring formed in the outer wall of the sleeve by the pressure filling the slight crevices at the edges of each adjoining conical spring disc. Rolled formed threads are stronger because the material is in compression and more accurate than cut threads and have a lower coefficient of friction than cut threads. Thus, tap forming threads is a method of nut tapping without cutting the material and may be used to form the sleeve wall to fill the recessed notches 26 in the lamninations inside diameter.

It will be appreciated that changes, variations and modifications may be made to the laminated nut structure of the present invention without departing from the spirit and scope of the present invention.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A laminated nut, comprising:
 a conical spring, top disc and a conical spring, bottom disc stacked upon each other defining a laminated stack having a common central bore and a polygonal shaped outer wrench engaging circumference;
 a generally cylindrical tension sleeve located in said central bore, the tension sleeve having an outer wall shaped to substantially conform with the shape of said central bore and an inner wall which is threaded;
 said tension sleeve having a first end and a second end, the first end of the tension sleeve includes an outwardly extending upper flange and the second end includes an outwardly extending bottom flange, the upper flange and the bottom flange being shaped and dimensioned to retain the top disc and the bottom disc in an stacked relation with the tension sleeve fixedly secured to the laminated stack, such that the conical spring discs and the tension sleeve rotate together.

2. The laminated nut according to claim 1, wherein the upper flange directly engages an upper surface of the top disc.

3. The laminated nut according to claim 1, wherein the bottom flange directly engages a lower surface of the bottom disc.

4. The laminated nut according to claim 1, further including a washer positioned between the bottom flange and the bottom disc of the laminated stack.

5. The laminated nut according to claim 1, further including at least one conical spring disc positioned between the top disc and the bottom disc.

6. The laminated nut according to claim 5, further including a plurality of conical spring discs positioned between the top disc and the bottom disc.

7. The laminated nut according to claim 1, where in the outer wrench engaging surface of the laminated stack is hex shaped.

8. The laminated nut according to claim 1, wherein the central bore of the laminated stack is non-round.

9. The laminated nut according to claim 8, wherein the central bore includes curved radiused areas about its circumference.

10. The laminated nut according to claim 9, wherein the threads along the inner wall of the tension sleeve are form tapped and force material into the radiused areas.

11. The laminated nut according to claim 10, wherein the top disc includes an obliquely oriented surface and the bottom disc includes an obliquely oriented surface.

12. The laminated nut according to claim 1, wherein the tension sleeve is split along its length.

13. The laminated nut according to claim 1, wherein the upper flange includes gussets.

* * * * *